United States Patent
Madoch et al.

[11] Patent Number: 5,987,111
[45] Date of Patent: *Nov. 16, 1999

[54] METHOD OF AGGREGATING A PLURALITY OF NETWORK TRAFFIC

[75] Inventors: Pitsa Madoch, Glenview; John Wesley Moss, Lake Zurich; Richard John Ebel, Algonquin; Gerald Joseph Steffgen, Orland Park; Carlos Hernan Donoso, Bartlett, all of Ill.

[73] Assignee: Ameritech Corporation, Hoffman Estates, Ill.

[*] Notice: This patent is subject to a terminal disclaimer.

[21] Appl. No.: 08/766,598

[22] Filed: Dec. 12, 1996

[51] Int. Cl.⁶ .............................. H04M 3/42; H04M 7/00; H04L 12/66
[52] U.S. Cl. .......................... 379/201; 379/220; 370/352
[58] Field of Search .................. 379/220, 219, 379/221, 207, 229, 230, 113, 154, 201; 370/352

[56] References Cited

U.S. PATENT DOCUMENTS

| | | | |
|---|---|---|---|
| 4,797,913 | 1/1989 | Kaplan et al. | 379/91 |
| 4,972,464 | 11/1990 | Webb et al. | 379/112 |
| 5,023,904 | 6/1991 | Kaplan et al. | 379/91 |
| 5,247,571 | 9/1993 | Kay et al. | 379/212 |
| 5,386,467 | 1/1995 | Ahmadl | 379/220 |
| 5,436,957 | 7/1995 | McConnell | 379/230 |
| 5,455,855 | 10/1995 | Hokari | 379/229 |
| 5,475,749 | 12/1995 | Akinpelu et al. | 379/221 |
| 5,483,582 | 1/1996 | Pugh et al. | 379/144 |
| 5,515,427 | 5/1996 | Carlsen et al. | 379/220 |
| 5,517,562 | 5/1996 | McConnell | 379/207 |
| 5,539,817 | 7/1996 | Wilkes | 379/230 |
| 5,550,912 | 8/1996 | Akinpelu et al. | 379/221 |
| 5,592,541 | 1/1997 | Fleischer, III et al. | 379/219 |
| 5,689,555 | 11/1997 | Sonnenberg | 379/219 |
| 5,703,938 | 12/1997 | Lucas et al. | 379/229 |
| 5,781,620 | 7/1998 | Montgomery et al. | 379/220 |

*Primary Examiner*—Krista Zele
*Assistant Examiner*—Benny Q. Tieu
*Attorney, Agent, or Firm*—Bruce E. Stuckman; Dale B. Halling

[57] ABSTRACT

A method of aggregating calls includes receiving a group of dialed digits at a service switching point (52). The service switching point (52) determines if an access code is present. When the access code is present, the service switching (52) transmits an information analyzed query (54) to a switching control point (56). The service switching point (52) then receives an analyze route message (60) from the switching control point (56). The service switching point (52) then routes a call to a hub service switching point (58).

24 Claims, 7 Drawing Sheets

METHOD OF AGGREGATING A PLURALITY OF NETWORK TRAFFIC

FIELD OF THE INVENTION

The present invention relates generally to the field of communications and more particularly to a method of aggregating a plurality of network traffic.

BACKGROUND OF THE INVENTION

Inter-exchange carriers (IXC) provide discounts on interLATA (Local Access and Transport Area) calls to their customers if they will aggregate their calls (network traffic) to a single point. To facilitate this service, inter-exchange carriers (IXC) offer to provide private facilities from each of the customer's locations to the single point of presence. FIG. 1 illustrates the situation. A customer having facility A 12, facility B 14 and facility C 16 has to aggregate all their interLATA calls. Facility A is coupled to a central office (CO) 18 that has a dedicated DS-1 line 20 to the IXC's POP 22. The central office 18 includes an alternate route selection system (ARS) 24. The ARS 24 can route interLATA calls to another IXC via another DS-1 or public office routes if, for instance, there is no capacity left on the DS-1 line 20. Facility B 14 and facility C 16 are coupled to CO 26. A second dedicated DS-1 line 28 connects the CO 26 to the POP 22. A second ARS 30 duplicating the function of the ARS 24 is required for the second CO 26. A duplicate ARS and another DS-1 line will be required for every CO used by a customer facility. Leasing DS-1 lines can be very expensive, especially if they are not used at capacity all the time. However, if the DS-1 lines are constantly being used at capacity, then a number of calls (network traffic) are having to be routed to a second route, public or another DS-1, that is more expensive.

Thus there exists a need for a method of aggregating calls (network traffic) that is flexible enough to handle peak loads without the customer having to pay for unused capacity and does not require duplication of systems, such as ARSs.

DETAILED DESCRIPTION OF THE DRAWINGS

The invention uses the advanced intelligent networks (AIN) features to aggregate calls (a plurality of network traffic) from a subscriber's multiple facilities to a single or plurality of hub service switching point (SSP). The calls are routed by the public switched network to a hub service switching point (SSP) and then to the IXC POP. In one embodiment there are several hub SSPs. In addition, the service provides flexible capacity to serve the subscriber's changing requirements.

Figure 1:
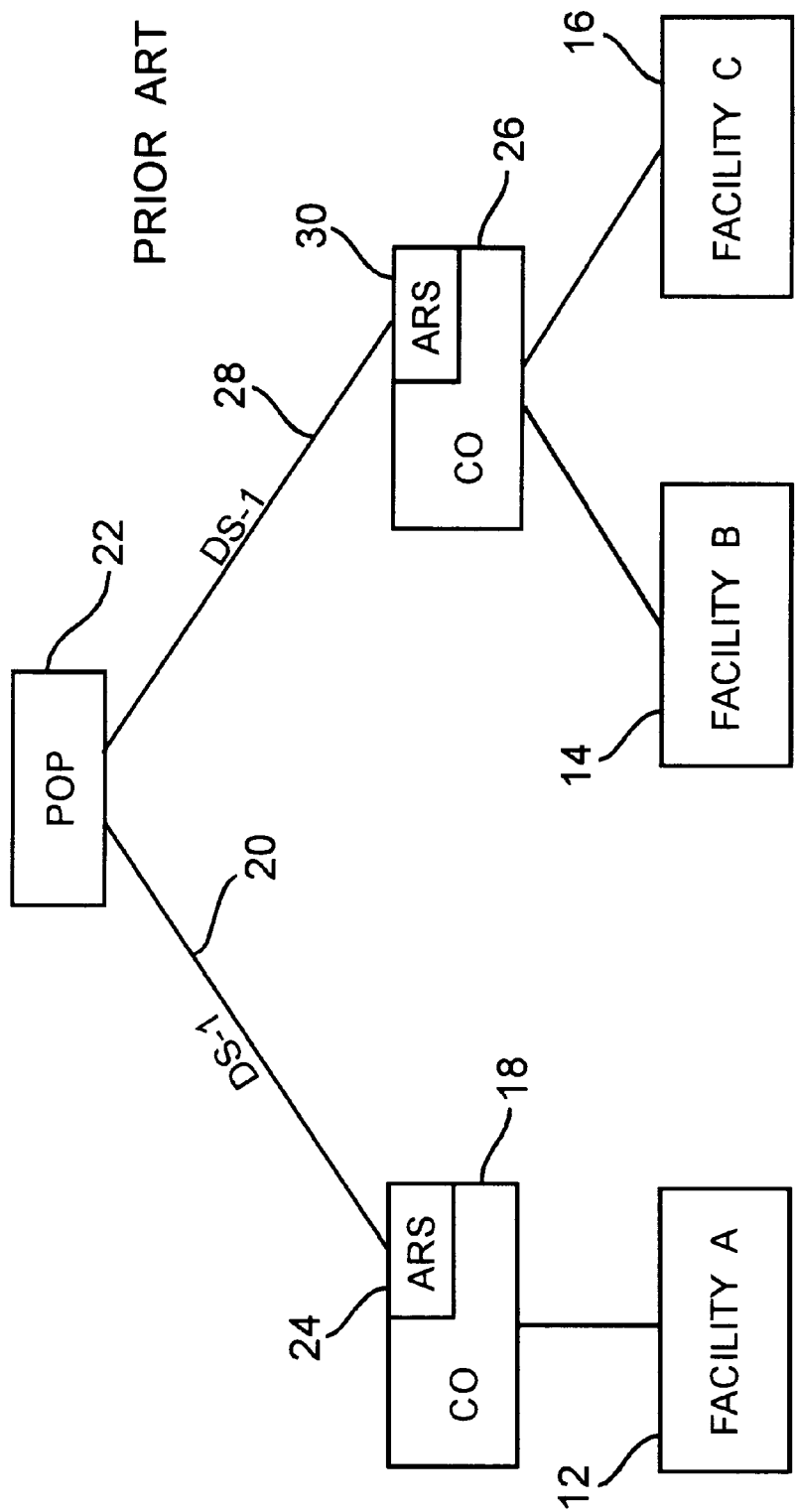
FIG. 1 is a block diagram of a prior art system for aggregating calls.
Figure 2:
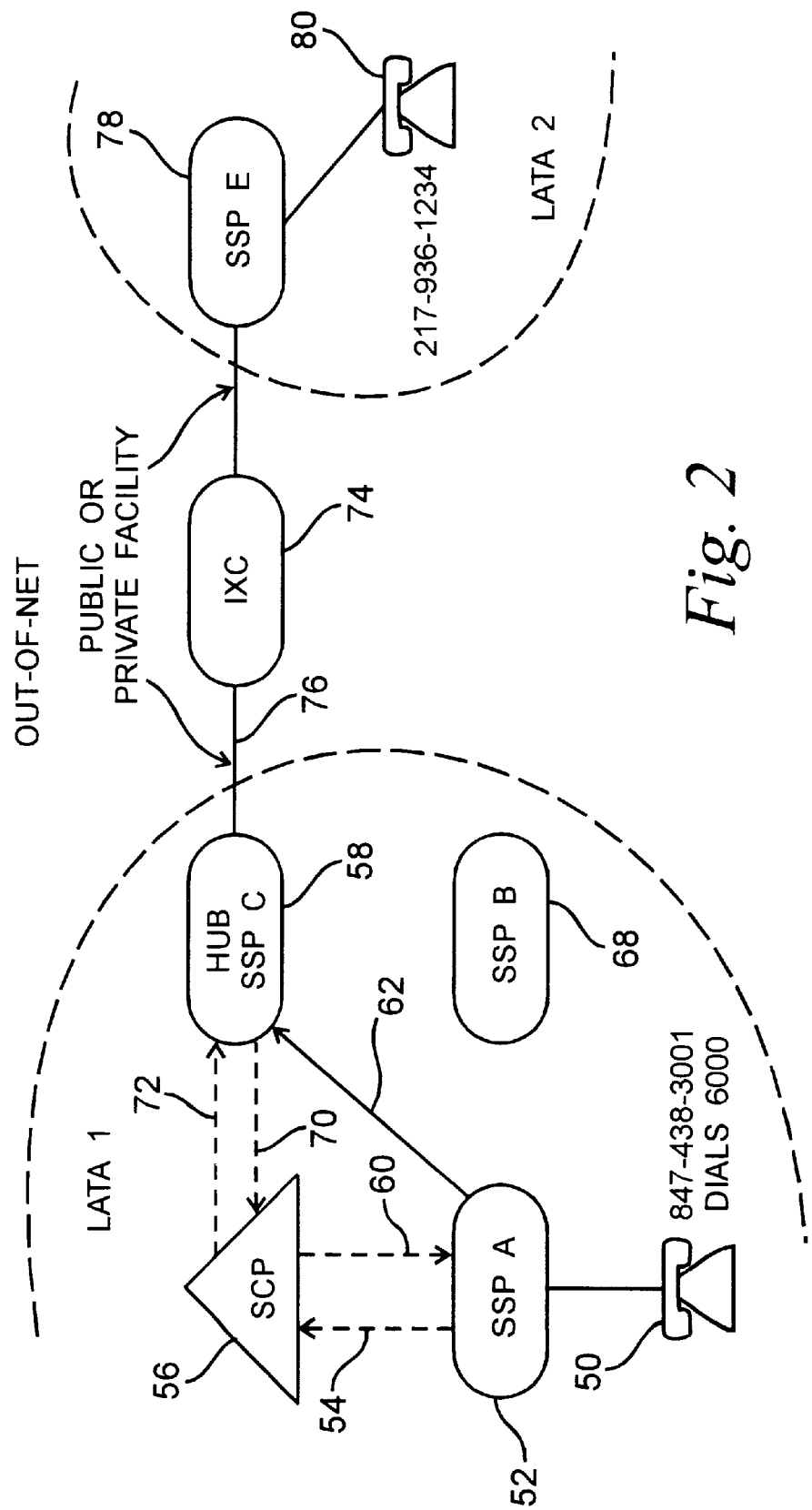
FIG. 2 is a schematic diagram of an intelligent network capable of implementing the invention.

FIG. 2 illustrates the process the advanced intelligent network uses to implement the invention. A subscriber 50 places an abbreviated call (network traffic access request) by dialing 6000 at one of his plurality of locations. The subscriber must have the ability to enter an access code to facilitate triggering. The call is received at service switching point A (SSP A, one of a plurality of central office switches) 52. The SSP 52 sends a query (information analyzed query) 54 to a switching control point (SCP) 56 over a signal system seven (SS7) signaling link. The query contains the calling party ID (i.e., 847-438-3001) and dialed digits (i.e., 6000). The SCP 56 translates the dialed digits into a corresponding routing number (e.g., 217-936-1234) and determines that the call is a direct dial interLATA call (interLATA network traffic request). In this example the call is also out of network. The SCP 56 determines that the call is to be redirected to the hub SSP C 58. The SCP 56 sends a response (analyze route message, routing instruction) 60 over the SS7 signaling link, that directs the SSP A 52 to route the call to the hub SSP C 58. This is accomplished by having the called party ID portion of the message set equal to the directory number of the hub SSP 58. The translated or true called routing number is returned in the redirected party ID parameter. The SSP (central office) 52 then routes 62 the call (network traffic) to the hub SSP (hub central office) 58 over the public network that connects SSP A, SSP B and SSP C together. In addition, the SSP 52 sends an initial address message (IAM) over the signal system 7 (SS7) signaling links that connects the SSPs 52, 58, 68, to the SCP 56. The IAM contains the translated or true called number (i.e., 217-936-1234) and the called number, which is the directory number of the hub SSP 58. The hub SSP (hub central office) 58 triggers on the called number and sends a second query (second information analyzed query) 70 to the SCP 56. The SCP 56 then sends a second response (second analyze route message) 72 containing routing information (translated or true routing number) to a single IXC POP 74, a billing information and a primary trunk group. Based on the routing information received in the second response, the hub SSP 58 routes the call to the IXC POP 74 over a shared or private facility 76. Thus the calls are aggregated with other calls (a plurality of other network traffic) at the hub SSP 58 and routed to one of the plurality of inter-exchange carrier selections. When a shared facility 76 is used to route the call the hub SSP 58 sends an IAM to the IXC 74 using SS7 signaling. When a shared facility 76 having feature group D signaling is used a charge number (hub SSP number) and a called number (i.e., 217-938-1234) are passed to the IXC 74. When a private facility 76 having standard tie lines is used, only the called number is passed on to the IXC 74. When private facilities having a primary rate ISDN are used, the charge number and the called number are passed to the IXC 74.

The IXC 74 then routes the call using standard long distance techniques to a SSP E 78 in the LATA 2 of the dialed number. The SSP 78 routes the call to the called party 80.

Figure 3:
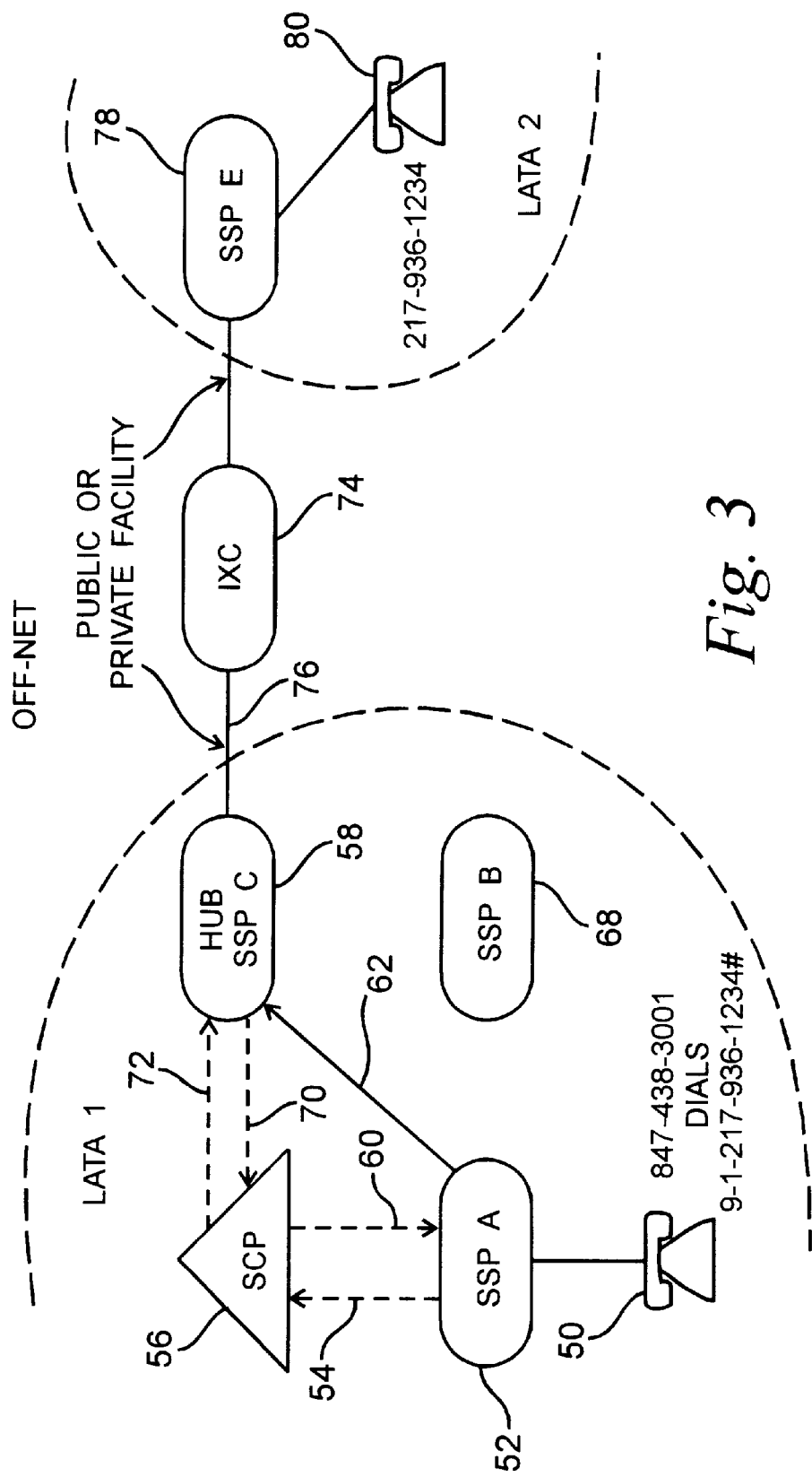
FIG. 3 is a schematic diagram of the intelligent network of FIG. 2 and illustrates another implementation of the invention.

FIG. 3 shows the same facilities as in FIG. 2 but illustrates an off network call. In this example, the calling party 50 dials an access code (i.e., 9) and then dials a plurality of digits (i.e., 217-936-1234#). The "#" is optional and expedites processing of the call. The SSP 52 receives the access code and dialed digits. Upon determining that the access code is present, the SSP 52 sends a query 54 containing the plurality of digits to the SCP 56. The SCP 56 will determine that the call is an interLATA call and check to see if the number is restricted. The restriction of called numbers will be discussed in more detail with respect to FIGS. 5–6. Assuming the call is not restricted, the SCP sends a response 60 redirecting the call to the hub SSP 58. The call is then processed in the same manner as described in FIG. 2.

Figure 4:
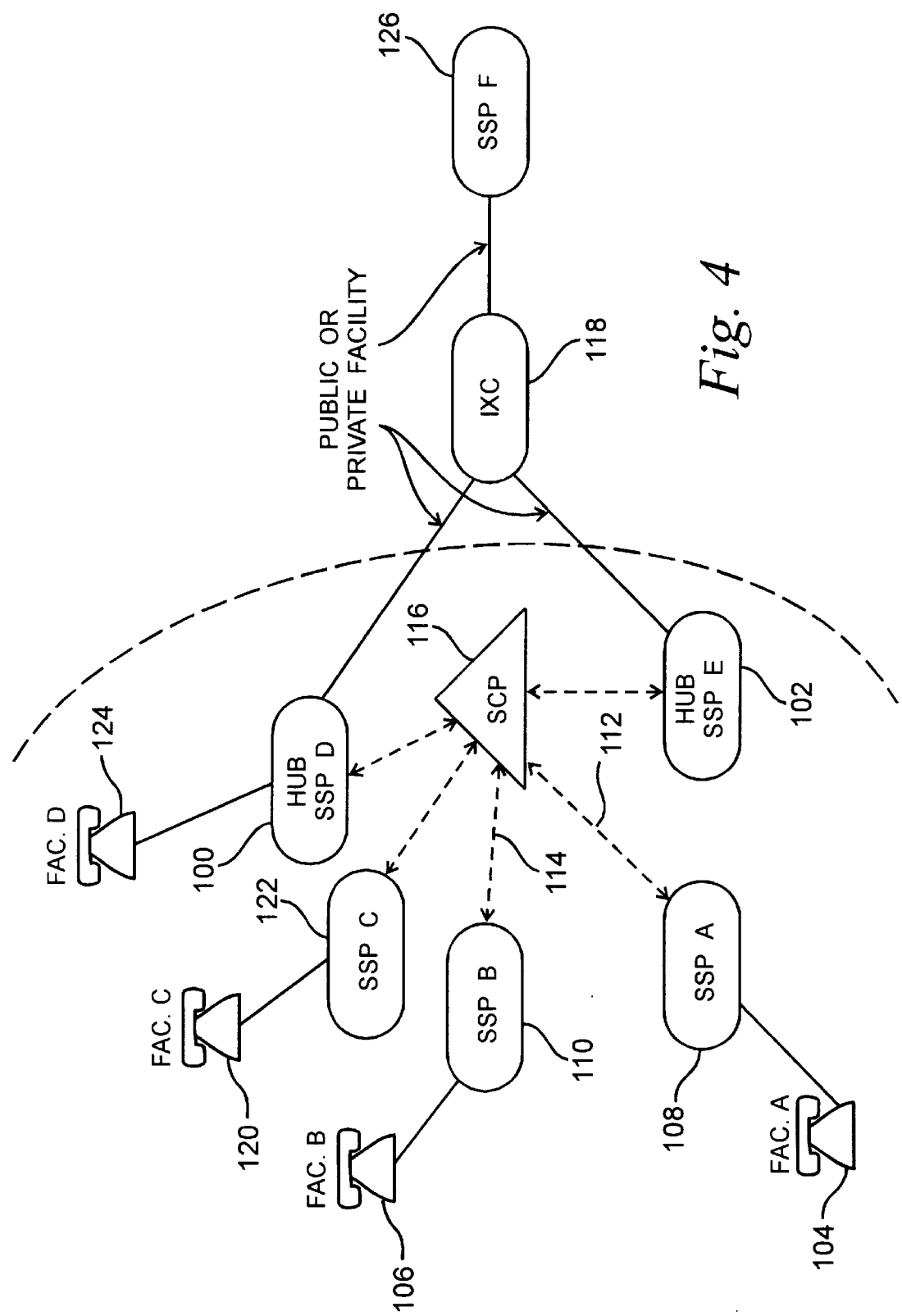
FIG. 4 is a schematic diagram of an intelligent network and illustrates another implementation of the invention.

FIG. 4 is a schematic diagram of an intelligent network and illustrates another implementation of the invention. In the implementation of FIG. 4 a plurality of hub SSPs 100, 102 are used to aggregate calls. Calls originating from facilities A and B 104, 106 are routed by SSP A 108 and SSP B 110 in an alternating pattern as received to hub SSPs 100, 102 (next hub service switching point). To accomplish this SSP A 108 and SSP B 110 send a query over the SS7 signaling lines 112, 114 to the SCP 116. The SCP 116 preforms the steps discussed with respect to FIGS. 2 & 3. In addition, the SCP 116 alternatively routes calls to each of the plurality of hub SSPs 100, 102. The hub SSPs 100, 102 will preform exactly the same operation to route the call to the IXC 118 as in FIGS. 2 & 3. When the call originates from facility C 120, the call will be routed by SSP C 122 to next hub SSP 100, 102. When a call originates from facility D 124 it is directly connected to the hub SSP 100. In this case the hub SSP 100 uses a centrex translation to route the call to the IXC 118. In addition, the hub SSP 100 will handle the call restriction process by using the centrex translations, instead of the SCP doing the call restrictions. The IXC 118 will then route the call to a destination SSP F 126.

Figure 5:
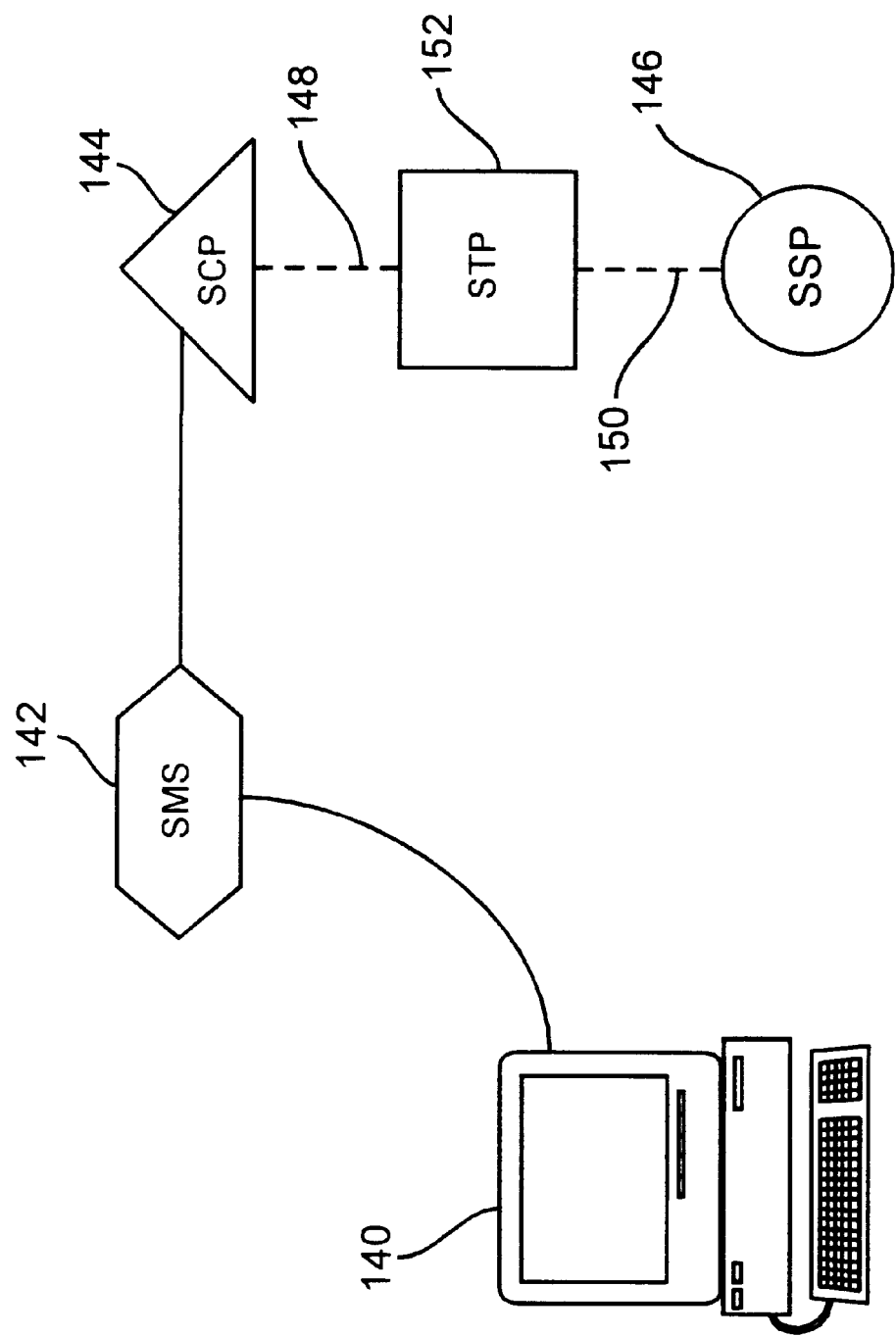
FIG. 5 is block diagram of a system for defining certain features of the invention.

FIG. 5 is block diagram of a system for defining certain features of the invention. One of the features provided by the invention, is the ability to restrict calls. Once a plurality of originating phones numbers have been selected for the aggregation service. The customer's administrator using a terminal 140 can input a plurality of lines (subset of the originating phone numbers, defined group of originating numbers) to be restricted. The administrator can restrict the lines from making international calls (01XXX) or making operator assisted calls (0 or 0+) or from specifying a carrier (10XXX). In addition the lines can restricted from making calls to a selected group of numbers (NPA NXX or NXX). This information is then transmitted to a service management system (SMS) 142. The information is then transmitted from the SMS 142 to the SCP 144. The SCP 144 determines if the dialed number meets a predefined criteria (selected group of numbers) and therefore is restricted. The SCP 144 communicates this information to the SSP 146 over an SS7 signaling link 148, 150 containing a signal transfer point 152. This allows the administrator to restrict all the phone lines from a factory facility from placing international calls, for example.

Figure 6:
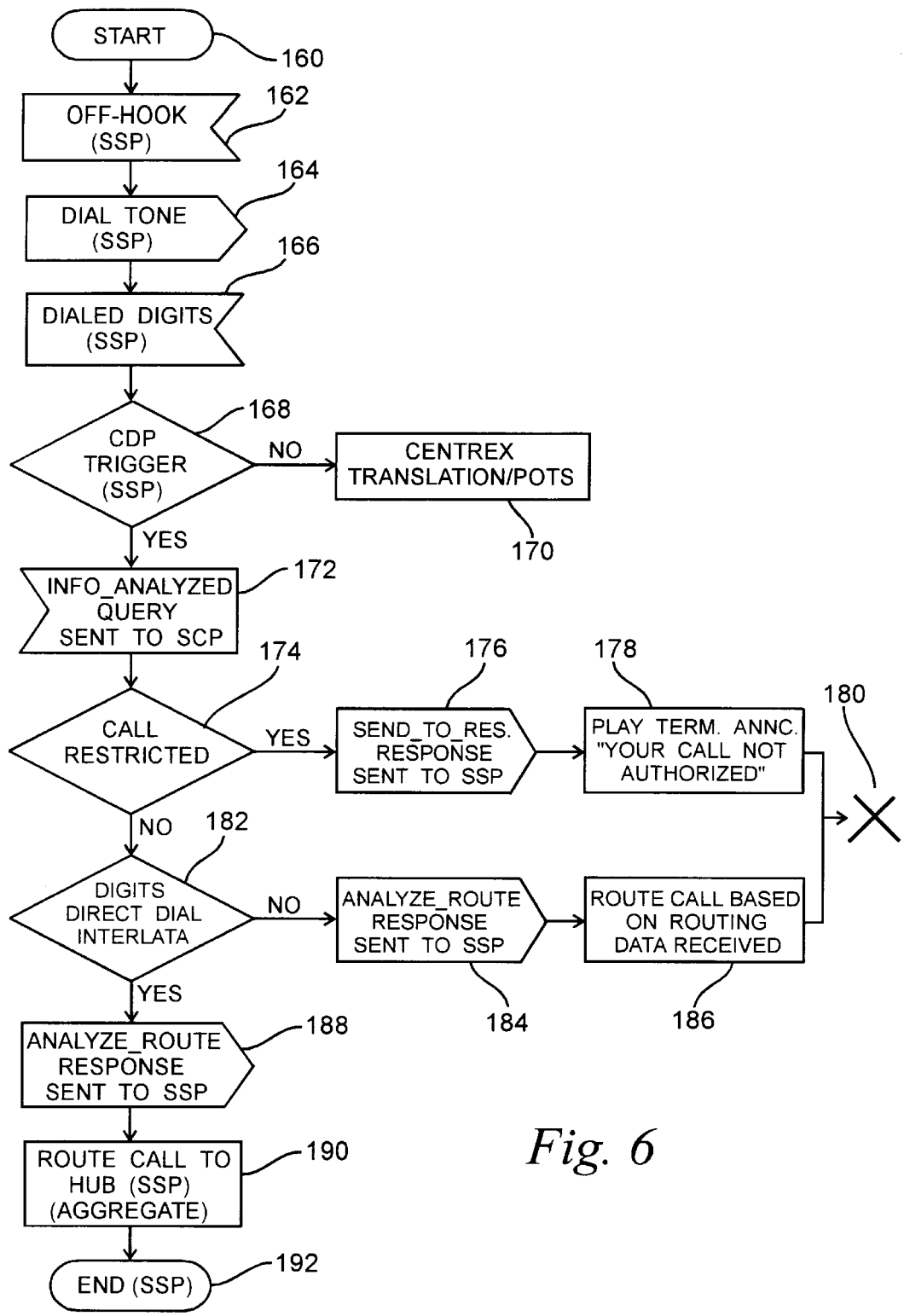
FIG. 6 is a flow chart of an embodiment of the steps a Service Switching Point (SSP) and a Switching Control Point (SCP) use in implementing the invention.

FIG. 6 is a flow chart of an embodiment of the steps a Service Switching Point (SSP) and a Switching Control Point (SCP) use in implementing the invention. The process starts, step 160, by the SSP receiving an off-hook signal from a customer telephone, at step 162. The SSP sends a dial tone to the customer telephone at step 164. The SSP then receives the dialed digits (destination number) at step 166. At step 168 the SSP determines if an access code (or Customized Dialing Plan trigger) is present. When the access code or CDP trigger is not present, centrex translation/POTS (plain old telephone service) processing is pursued at step 170. Step 170 is performed when the calling facility is directly connected to the hub SSP.

When the access code is present, an information analyzed query is sent to the SCP at step 172. The SCP then determines if the call is restricted at step 174. When the call is restricted a restricted call response message is sent to the SSP at step 176. The SSP then plays the terminating announcement that the call is not authorize at step 178, which ends the processing at step 180.

When the call is not restricted at step 174, the SCP determines if the dialed digits (plurality of dialed digits) require a direct dialed interLATA call at step 182. The service of toll aggregation requires that the call be the direct dialed interLATA. However, if the call is not the direct dialed interLATA call a routing response is sent to the SSP at step 184. The SSP then routes the call based on the routing response at step 186, which ends processing at step 180.

When the call is the direct dialed interLATA call, an analyze route response is transmitted to the SSP at step 188. The SSP then routes the call to the hub SSP for aggregation at step 190 and sends an initial address message to the hub SSP, which ends the processing for initiating SSP at step 192.

Figure 7:
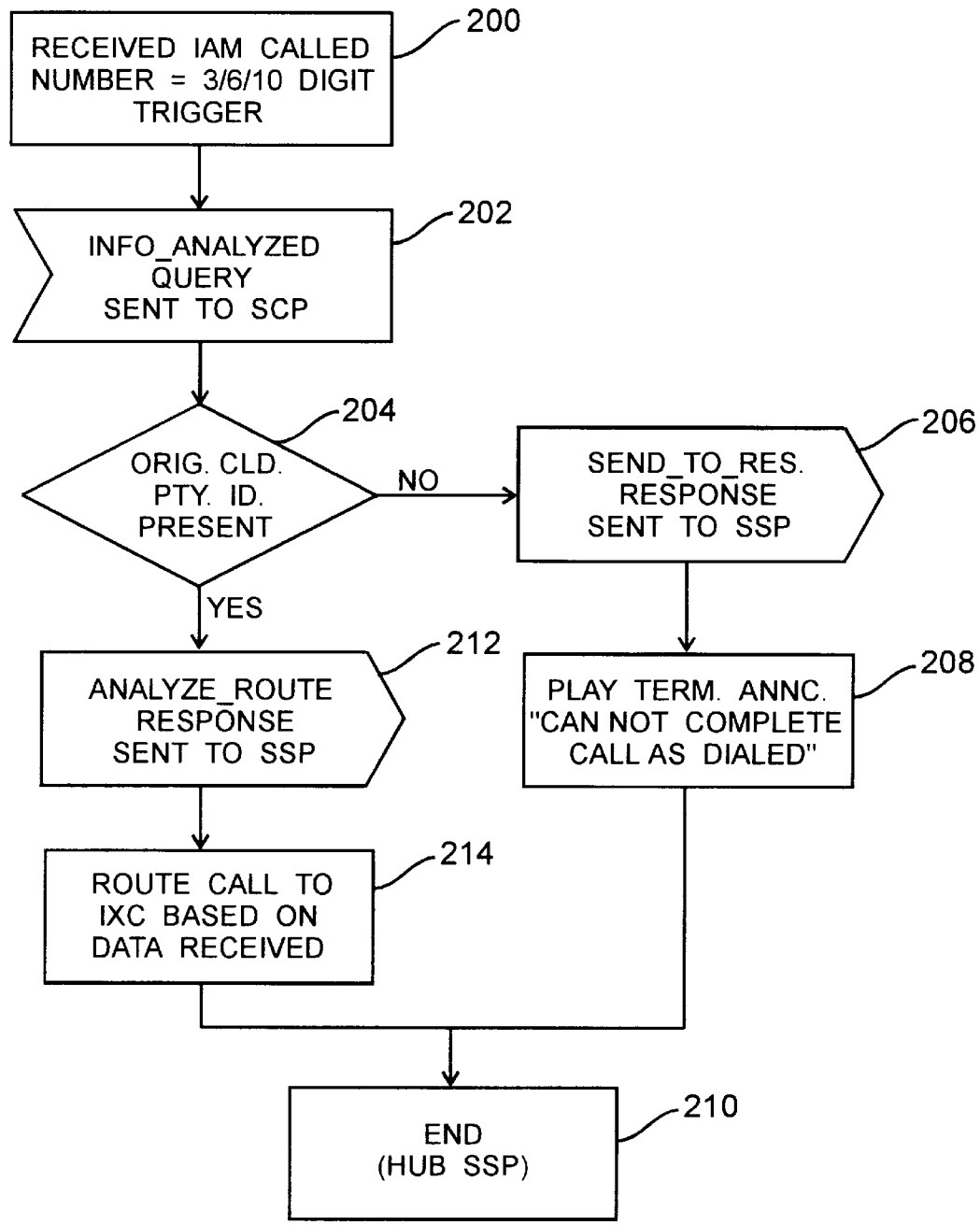
FIG. 7 is a flow chart of an embodiment of the steps a hub SSP and the SCP use in implementing the invention.

FIG. 7 is a flow chart of an embodiment of the steps a hub SSP and the SCP use in implementing the invention. The process starts by the hub SSP receiving the IAM and determining that the called number is a 3/6/10 digit trigger at step 200. Based on this trigger the hub SSP transmits an information analyzed query to the SCP at step 202. Next the SCP determines if the original called party ID is present at step 204. When the original called party ID is not present, sending a cannot complete response to the hub SSP at step 206. A terminating announcement is played that the call cannot be completed at step 208, which ends the call processing for the hub SSP at step 210.

When the original called party ID is present, sending an analyze route message to the hub SSP at step 212. The hub SSP then routes the call to the IXC based on the data received at step 214, which ends the call processing for the hub SSP at step 210.

Using the methods described above a subscriber has a flexible service that can handle peak loads, without paying for extra capacity. In addition, the customer no longer is required to lease DS-1 lines from each of his facilities to the IXC POP. This can significantly reduce the costs of aggregating calls to get a discount from the IXC. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of aggregating a plurality of network traffic, comprising the steps of:
   (a) receiving a network traffic access request at one of a plurality of central office switches;
   (b) sending a query to a switching control point;
   (c) determining if a network traffic access request is an interLATA network traffic request;
   (d) when the network traffic access request is the interLATA network traffic request, transmitting a routing instruction to the one of the plurality of central office switches; and
   (e) routing a network traffic to a hub central office.

2. The method of claim 1, further including the step of:
   (f) combining the network traffic with a plurality of other network traffic.

3. The method of claim 1, further including the step of:
   (g) routing the network traffic to a point of presence associated with one of a plurality of inter-exchange carrier selections.

4. The method of claim 1, wherein step (d) further includes the step of transmitting a billing information.

5. The method of claim 1, wherein step (a) further includes the step of receiving a destination number.

6. The method of claim 1, wherein step (a) further includes the step of:
   (a1) determining if the network traffic access request is from a defined group of originating numbers;
   (a2) when the network traffic access request is from the defined group of originating numbers, proceeding to step (b).

7. A method of aggregating calls, comprising the steps of:
   (a) receiving a plurality of dialed digits at a service switching point;
   (b) determining if an access code is present;
   (c) when the access code is present, transmitting an information analyzed query to a switching control point;
   (d) receiving an analyze route message; and
   (e) routing a call to a hub service switching point.

8. The method of claim 7, further including the steps of:
   (f) receiving an initial address message at the hub service switching point;
   (g) transmitting a second information analyzed query to the switching control point;
   (h) receiving a second analyze route message; and
   (i) routing the call to an inter-exchange carrier.

9. The method of claim 7, wherein step (a) further includes the steps of:
   (a1) receiving an off-hook signal;
   (a2) transmitting a dial tone.

10. The method of claim 7, wherein step (c) further includes transmitting the plurality of dialed digits as part of the information analyzed query.

11. The method of claim 7, wherein step (d) further includes the steps of:
    (d1) determining if the call is restricted;
    (d2) when the call is not restricted, determining if the plurality of dialed digits form a direct dial interLata call;
    (d3) when the plurality of dialed digits form the direct dial interLata call, proceeding to step (e).

12. The method of claim 8, wherein step (f) further includes the step of:
    (f1) triggering on a called number in the initial address message.

13. The method of claim 8, wherein step (h) further includes the step of:
    (h1) receiving a primary trunk group as part of the second analyze route message.

14. A method of aggregating calls, comprising the steps of:
    (a) selecting a plurality of originating phone numbers for an aggregation service;
    (b) receiving a plurality of dialed digits from one of the plurality of originating phone numbers at a service switching point;
    (c) when the service switching point is not a hub service switching point, transmitting a query to a switching control point;
    (d) receiving a routing message from the switching control point; and
    (e) routing a call to the hub service switching point.

15. The method of claim 14, further including the step of:
    (f) when the service switching point is the hub service switching point, routing the call using a centrex translation to an inter-exchange carrier.

16. The method of claim 15, wherein step (f) further includes the step of:
    (f1) restricting the call when the plurality of dialed digits meet a predefined criteria, using the centrex translation.

17. The method of claim 14, wherein step (a) further includes the step of:
    (a1) selecting a plurality of lines to be restricted.

18. The method of claim 17, further including the steps of:
    (a2) restricting each of the plurality of lines from making international calls.

19. The method of claim 17, further including the steps of:
    (a2) restricting each of the plurality of lines from placing a call to a selected group of numbers.

20. The method of claim 17, wherein step (a1) further includes the step of entering, by an administrator, the plurality of lines through a terminal.

21. The method of claim 14, further including the steps of:
    (f) receiving an initial address message containing a called number at the hub service switching point;
    (g) transmitting a second query to the switching control point;
    (h) receiving a second routing message;
    (i) routing the call to an inter-exchange carrier.

22. The method of claim 21, wherein step (h) further includes the step of:
    (h1) receiving a primary trunk group as part of the second analyze route message.

23. A method of aggregating calls, comprising the steps of:
    (a) receiving a query from a service switching point;
    (b) determining which of a plurality of hub service switching points are to receive the next call; and
    (c) transmitting a response to the service switching point including a routing instruction to a next hub service switching point.

24. The method of claim 23, wherein step (c) further includes the step of:
    (c1) determining if a destination number is restricted;
    (c2) when the destination number is restricted, sending a call cannot be completed message to the service switching point.

* * * * *